United States Patent [19]

Suzuki et al.

[11] Patent Number: 5,559,200

[45] Date of Patent: Sep. 24, 1996

[54] RESIN FOR PLASTIC LENS

[75] Inventors: Minoru Suzuki, Funabashi; Akihiro Sasaki, Ichihara; Hiromasa Kawai, Ichihara; Fumiaki Kanega, Ichihara, all of Japan

[73] Assignee: Hitachi Chemical Company, Ltd., Tokyo, Japan

[21] Appl. No.: 470,631

[22] Filed: Jun. 6, 1995

Related U.S. Application Data

[62] Division of Ser. No. 128,772, Sep. 30, 1993, Pat. No. 5,449,731.

[30] Foreign Application Priority Data

Oct. 1, 1992 [JP] Japan .................... 4-263513

[51] Int. Cl.$^6$ ........................................... C08F 2/38
[52] U.S. Cl. ........................................ 526/224; 526/324
[58] Field of Search ................................ 526/324, 224

[56] References Cited

U.S. PATENT DOCUMENTS 5,026,807  6/1991  Ohira et al. .................. 526/324
5,059,667 10/1991  Nakamura .................... 526/324
5,132,384  7/1992  Matsuda et al. ............... 526/324

FOREIGN PATENT DOCUMENTS 0242618  10/1987  European Pat. Off. ........ 526/324
60-250010 12/1985  Japan ........................ 526/324
63-162707  7/1988  Japan ........................ 526/324
0909896  11/1962  United Kingdom .

OTHER PUBLICATIONS

JP 62 (1987)–232414 "Cast Moldable Optical Resin Material" by Sugawara.

Primary Examiner—Joseph L. Schofer
Assistant Examiner—N. Sarafim
Attorney, Agent, or Firm—Antonelli, Terry, Stout & Kraus

[57] ABSTRACT

A transparent resin obtained by polymerizing styrene, a methacrylic or acrylic acid ester, a polyfunctional monomer, and if necessary a copolymerizable vinyl monomer in the presence of a molecular weight modifier is suitable for producing a polymer lens having a low specific gravity, and excellent in transparency, edging ability with other good properties.

7 Claims, No Drawings

RESIN FOR PLASTIC LENS

This application is a Divisional application of application Ser. No. 128,772, filed Sep. 30, 1993 now U.S. Pat. No. 5,449,731.

BACKGROUND OF THE INVENTION

This invention relates to a resin usable as a material for producing plastic (or polymer) lenses, particularly plastic lenses for spectacles, a process for producing such a resin and a plastic lens obtained by using such a resin.

As materials for optical lenses, there have been used acrylic resins, diethylene glycol bisallyl carbonate resins (e.g. CR-39), polystyrenes, polycarbonates, etc., having high transparency. Among these resins, diethylene glycol bisallyl carbonates, which are a thermosetting resin, are widely used as resins for lenses of spectacles, due to having excellent transparency, low dispersion (high Abbe's number), excellent heat resistance and excellent impact strength. But there is a problem in that when the lenses are produced by using the diethylene glycol bisallyl carbonate, the refractive index is as low as 1.50 and the lens thickness becomes larger compared with the case of lens made of glass (this is remarkable in thick-lensed spectacles).

With a recent demand for thin and light-weight spectacle lenses, materials for spectacle lenses having a high refractive index have been developed variously. For example, Japanese Patent Unexamined Publication (JP-A) No. 56-166214 discloses a copolymer of a dimethacrylate having a nuclear halogen-substituted aromatic ring and a monofunctional monomer having an aromatic ring. This material has a high refractive index, but has a problem in that it has a large specific gravity due to having halogen groups in the resin skeleton. Further, JP-A 63-46213 discloses a copolymer of polyisocyanate and polythiol. This material has a high refractive index, but has a problem in that it is low in heat resistance.

On the other hand, as thermoplastic resins having a high refractive index, there are known polystyrenes (refractive index 1.58, Abbe's number 31) and polycarbonates (refractive index 1.58, Abbe's number 30). These resins have a high refractive index, but have a large chromatic aberration due to low Abbe's number. Further the polystyrenes are undesirably low in heat resistance and the polycarbonates are undesirably low in surface hardness and easily scratched. In order to improve such disadvantages, there are proposed methyl methacrylate/styrene resins, and tricyclo[$5.2.1.0^{2,6}$] deca-8-yl methacrylate/styrene resins (JP-A 62-246001). But these resins have problems in that these resins are high in the haze rate, low in transparency, further the methyl methacrylate/styrene resin is low in heat resistance. In addition, since these resins are thermoplastic resins, there is a problem in edging ability.

Further, JP-A 62-232414 discloses a copolymer of tricyclo[$5.2.1.0^{2,6}$]deca-8-yl methacrylate/styrene/crosslinkable polyfunctional monomer. This copolymer is insufficient in the haze rate.

But these materials mentioned above are poor in resistance to scratching as in general plastics. In order to improve this, it is proposed to coat the lens surface with an organic silane cured film. Buch such an organic silane cured film is undesirably insufficient in uniform adhesiveness to the plastic lens surface.

In order to improve the surface properties of plastic substrate and to improve adhesiveness to silicone cured film, there are proposed thermoplastic acrylic primer (JP-A 52-138565), acrylic primer having a functional group such as an amino group (JP-A 53-138476), a silicone primary containing a reaction product of alkoxysilane having a functional group such as an amino group or a hydroxyl group and a cyclic acid anhydride (JP-A 53-81533), a silicone primer containing a mixture of a hydrolyzate of epoxysilane and an aminosilane (JP-A 54-63176), an acrylic primer containing a functional group-containing thermoplastic acrylic resin and a ultraviolet absorbing agent (JP-A 55-500809), an acrylic primer containing a thermosetting acrylic emulsion and a ultraviolet screening compound (JP-A 58-160033), a silicone primer containing a reaction product of an aminosilane, an epoxysilane and an acid anhydride (JP-A 56-16573), a process for improving an adhesive strength by coating a melamine modified acrylic emulsion (JP-A 56-88469), a thermoplastic acrylic primer containing a reaction product of an acrylic monomer, an epoxy methacrylate and a hydroxybenzophenone ultraviolet absorbing agent (JP-A 57-23661), a primer containing a self-crosslinkable acrylic copolymer (JP-A 57-76035), a primer containing a polyfunctional vinyl polymer (JP-A 57-140162), a primer containing an acrylic polymer and an alkyltrialkoxysilane (JP-A 57-162729), a primer containing a copolymer of methyl methacrylate and methyl acrylate (JP-A 58-179237), etc.

These materials have been developed depending on individual objects, but are still insufficient for giving sufficient effects for plastic lens substrates.

As mentioned above, there were no resins for plastic lenses having a small specific gravity and satisfying properties required for plastic lenses. Further, there were no plastic lens substrates having a low specific gravity, and there were no primers and no silicone cured films having a sufficient adhesive strength to such plastic lens substrates.

SUMMARY OF THE INVENTION

It is an object of the present invention to provide a resin for plastic lenses having excellent transparency and edging ability, small in specific gravity, low in dispersion (high Abbe's number), high in refractive index, and high in heat resistance, and a process for producing such a resin. It is another object of the present invention to provide a plastic lens comprising a plastic lens substrate having such a small specific gravity, a primer formed thereon and having a sufficient adhesive strength to the plastic lens substrate, and a silicone cured film formed thereon.

The present invention provides a resin for plastic lens comprising a transparent resin obtained by copolymerizing (a) 30 to 60 parts by weight of styrene, (b) 10 to 70 parts by weight of methacrylic acid ester or acrylic acid ester having an alicyclic hydrocarbon group having 5 to 22 carbon atoms at the ester portion, (c) 1 to 30 parts by weight of a polyfunctional monomer having 2 or more radical polymerizable functional groups, and (d) 0 to 40 parts by weight of a copolymerizable vinyl monomer other than the components (a) to (c), a total of (a) to (d) being 100 parts by weight, in the presence of 0.1 to 5% by weight of a molecular weight modifier based on the weight of the total monomers, said resin having a specific gravity of 1.15 or less, a refractive index of 1.54 or more and an Abbe's number of 35 or more.

The present invention also provides a process for producing a resin for plastic lens, which comprises polymerizing (a) 30 to 60 parts by weight of styrene, (b) 10 to 70 parts by weight of methacrylic acid ester or acrylic acid ester having as alicyclic hydrocarbon norbornylmethyl methacrylate, isobornyl methacrylate, bornyl methacrylate, menthyl methacrylate, phenethyl methacrylate, adamantyl methacrylate, dimethyladamantyl methacrylate, tricyclo[5.2.1.0$^{2,6}$]deca-8-yl methacrylate, tricyclo[5.2.1.0$^{2,6}$]deca-4-methyl methacrylate, cyclodecyl methacrylate, etc.; acrylic acid esters such as cyclopentyl acrylate, cyclohexyl acrylate, methylcyclohexyl acrylate, trimethylcyclohexyl acrylate, norbornyl acrylate, norbornylmethyl acrylate, isobornyl acrylate, bornyl acrylate, menthyl acrylate, phenethyl acrylate, adamantyl acrylate, dimethyladamantyl acrylate, tricyclo [5.2.1.0$^{2,6}$]deca-8-yl acrylate, tricyclo[5.2.1.0$^{2,6}$]deca-4-methyl acrylate, cyclodecyl acrylate, etc. These compounds can be used singly or as a mixture thereof. From the viewpoints of Abbe's number, specific gravity and heat resistance, the use of cyclohexyl methacrylate, norbornyl methacrylate, norbornylmethyl methacrylate, tricyclo[5.2.1.0$^{2,6}$]deca-8-yl methacrylate and tricyclo[5.2.1.0$^{2,6}$]deca-4-methyl methacrylate is particularly preferable.

The component (b) is used in an amount of 10 to 70 parts by weight per 100 parts by weight of the total monomers. When the amount is less than 10 parts by weight, no effective improvement in heat resistance is observed. On the other hand, when the amount is more than 70 parts by weight, unreacted monomer of methacrylic ester or acrylic ester having an alicyclic hydrocarbon group is undesirably increased. Further, 1,3-butylene glycol dimethacrylate, 1,4-butanediol dimethacrylate, 1,6-hexanediol dimethacrylate, neopentyl glycol dimethacrylate, 1,9-nonanediol dimethacrylate, 1,10-decanediol dimethacrylate and 1,12-dodecanediol dimethacrylate.

The component (c) is used in an amount of 1 to 30 parts by weight, preferably 5 to 15 parts by weight, per 100 parts by weight of the total amount of the monomers. When the amount is more than 30 parts by weight, the specific gravity becomes larger, particularly easily becomes more than 1.15. On the other hand, when the amount is less than 1 part by weight, there arises problems in the heat resistance and edging ability.

As the component (d), i.e. the copolymerizable vinyl monomer other than the components (a) to (c), there can be used any vinyl monomers so long as they do not fundamentally damage the transparency of the polymer. Examples of the vinyl monomer are acrylic acid esters such as methyl acrylate, ethyl acrylate, propyl acrylate, n-butyl acrylate, i-butyl acrylate, t-butyl acrylate, pentyl acrylate, n-hexyl acrylate, 2-ethylhexyl acrylate, n-octyl acrylate, dodecyl acrylate, octadecyl acrylate, butoxyethyl acrylate, phenyl acrylate, benzyl acrylate, naphthyl acrylate, glycidyl acrylate, 2-hydroxyethyl acrylate, etc.; methacrylic acid esters such as methyl methacrylate, ethyl methacrylate, propyl methacrylate, n-butyl methacrylate, group having 5 to 22 carbon atoms at the ester portion, (c) 1 to 30 parts by weight of a polyfunctional monomer having 2 or more radical polymerizable functional groups, and (d) 0 to 40 parts by weight of a copolymerizable vinyl monomer other than the components (a) to (c), a total of (a) to (d) being 100 parts by weight, in the presence of 0.1 to 5% by weight of a molecular weight modifier based on the weight of the total monomers.

The present invention further provides a plastic lens comprising a plastic lens substrate mainly made of the above-mentioned resin, a primer layer formed on one or both surfaces of the plastic lens substrate, said primer layer being a resin film comprising as a main component a copolymer of an alkyl acrylate or alkyl methacrylate and an aromatic vinyl compound as essential components, said copolymer further containing at least one functional group selected from a hydroxyl group, a carboxyl group, an epoxy group and an alkoxysilyl group, and a layer of cured silicone resin formed on the primer layer.

DESCRIPTION OF THE PREFERRED EMBODIMENTS

The resin for plastic lenses of the present invention comprises a transparent resin obtained by copolymerizing (a) 30 to 60 parts by weight of styrene, (b) 10 to 70 parts by weight of methacrylic acid ester or acrylic acid ester having an alicyclic hydrocarbon i-butyl methacrylate, t-butyl methacrylate, pentyl methacrylate, n-hexyl methacrylate, 2-ethylhexyl methacrylate, n-octyl methacrylate, dodecyl methacrylate, octadecyl methacrylate, butoxyethyl methacrylate, phenyl methacrylate, benzyl methacrylate, naphthyl methacrylate, glycidyl methacrylate, 2-hydroxyethyl methacrylate, etc.; aromatic vinyl compounds such as α-methylstyrene, α-ethylstyrene, α-fluorostyrene, α-chlorostyrene, α-bromostyrene, fluorostyrene, chlorostyrene, bromostyrene, methylstyrene, methoxystyrene, etc.; N-substituted maleimides such as N-methylmaleimide, N-ethylmaleimide, N-propylmaleimide, N-butylmaleimide, N-cyclohexylmaleimide, N-phenylmaleimide, N-methylphenylmaleimide, N-chlorophenylmaleimide, N-methoxyphenylmaleimide, N-carboxyphenylmaleimide, etc.; acrylamides and methacrylamides such as acrylamide, methacrylamide, N-dimethylacrylamide, N-diethylacrylamide, N-dimethylmethacrylamide, N-diethylmethacrylamide, etc.; metal salts of acrylic or methacrylic acid such as calcium acrylate, barium acrylate, lead acrylate, tin acrylate, zinc acrylate, calcium methacrylate, barium methacrylate, lead methacrylate, tin methacrylate, zinc methacrylate, etc.; unsaturated fatty acids such as acrylic acid, methacrylic acid, etc.; cyanide vinyl compounds such as acrylonitrile, methacrylonitrile, etc. These compounds can used singly or as a mixture thereof.

Among these compound, from the viewpoints of transparency, heat resistance and impact resistance, the use of a methacrylic acid ester such as methyl methacrylate, ethyl methacrylate, propyl methacrylate, n-butyl methacrylate, i-butyl methacrylate, t-butyl methacrylate, pentyl methacrylate, n-hexyl methacrylate, 2-ethylhexyl methacrylate, n-octyl methacrylate, butoxyethyl methacrylate, phenyl methacrylate, benzyl methacrylate, naphthyl methacrylate, or glycidyl methacrylate is preferable.

When the amount of the vinyl monomer (d) is more than 40 parts by weight, the refractive index easily becomes smaller, particularly less than 1.54 and the specific gravity also becomes larger, particularly more than 1.15.

As the molecular weight modifier, there can be used conventional chain transfer agents, mercaptans, diallyl disulfides, chloroform, carbon tetrachloride, etc. Considering the transparency, color, and heat resistance as the plastic lens, the use of a dimer of α-methylstyrene is preferable.

The molecular weight modifier is used in an amount of 0.1 to 5% by weight based on the total weight of the monomers used. When the amount is less than 0.1% by weight, the haze rate becomes higher, while when the amount of more than 5% by weight, there arise problems of lowering various physical properties such as heat resistance, etc.

In the production of the resin for plastic more than 70% by weight, there is a tendency to lower film forming properties due to lowering in solubility in an organic solvent. In addition, when the amount of the polymerizable monomer having a reactive residue is less than 1% by weight or more than 20% by weight, there is a tendency to lower the adhesive strength to the cured silicone resin layer.

Whole monomers for forming the copolymer of the primer layer are polymerized in the presence of a polymerization initiator. As the polymerization initiator, there can be used conventional radical polymerization initiators. For example, there can be used the polymerization initiators used for producing the resin for plastic lenses mentioned above. The amount of the polymerization initiator is preferably 0.001 to 10 parts by weight per 100 parts by weight of the total monomers. The amount of 0.01 to 5 parts of the polymerization initiator is particularly preferable, considering the surface state of the resulting copolymer and the polymerization time.

The primer layer can be formed by coating a solution of the copolymer (a primer solution) on the substrate by a dipping method, a spin coating method, a flow coating method, a spray method, followed by air-drying or drying at 50° to 130° C. for 3 to 60 minutes for curing.

The primer layer preferably has a thickness of 1 to 10 μm, more preferably 2 to 5 μm. If necessary,

COMPARATIVE EXAMPLES 1 TO 9

To a liquid monomer mixture as shown in Table 2, 0.5 part of lauroyl peroxide and 0.2 part of 1,1-bis(t-butylperoxy)-3,3,5-trimethylcyclohexane as radical polymerization initiators were added and stirred sufficiently. Then, the resulting mixture was poured into a mold comprising two sheets of glass and a gasket and heated from 30° C. to 90° C. in 20 hours. A cured lens was taken out of the mold and heated at 120° C. for 1 hour.

The lenses obtained from Examples 1 to 19 and Comparative Examples 1 to 9 were subjected to measurements of refractive indexes, Abbe's numbers, specific gravities, heat resistance, transparency, impact resistance, chemical resistance, edging ability and listed in Tables 3 and 4.

The properties were evaluated as follows.

Refractive index, Abbe's number

Using an Abbe refractometer (mfd. by Atago Co., Ltd.), the measurement was carried out at 20° C. The values in Tables 3 and 4 were obtained by using D-line (589.3 nm).

Specific gravity

Measured by an underwater substituting method.

Heat resistance

Using Thermal Mechanical Anallyzer (TMA) (mfd. by Seiko Instruments Inc.), a softening temperature (Tg) was measured. group having 5 to 22 carbon atoms at the ester portion, (c) 1 to 30 parts by weight of a polyfunctional monomer having 2 or more radical polymerizable functional groups, and (d) 0 to 40 parts by weight of a copolymerizable vinyl monomer other than the components (a) to (c), a total of (a) to (d) being 100 parts by weight, in the presence of 0.1 to 5% by weight of a molecular weight modifier based on the weight of the total monomers, said resin having a specific gravity of 1.15 or less, a refractive index of 1.54 or more and an Abbe's number of 35 or more.

In the resin mentioned above, the styrene is used in an amount of 30 to 60 parts by weight per 100 parts by weight of the total weight of the monomers. When the amount is less than 30 parts by weight, it becomes difficult to make the refractive index high, particularly 1.54 or more. On the other hand, when the amount is more than 60 parts by weight, it is difficult to obtain optically low dispersion, particularly to make the Abbe's number 35 or more, and the heat resistance is undesirably lowered.

As the component (b), i.e. the methacrylic acid ester or acrylic acid ester having an alicyclic hydrocarbon group having 5 to 22 carbon atoms at the ester portion, there can be used methacrylic acid esters such as cyclopentyl methacrylate, cyclohexyl methacrylate, methylcyclohexyl methacrylate, trimethylcyclohexyl methacrylate, norbornyl methacrylate, there arises a problem of lowering the impact resistance.

As the component (c), i.e. polyfunctional monomer having 2 or more radical polymerizable functional groups, there can be used acrylic acid esters such as ethylene glycol diacrylate, diethylene glycol diacrylate, triethylene glycol diacrylate, tetraethylene glycol diacrylate, glycerine diacrylate, 1,3-butylene glycol diacrylate, 1,4-butanediol diacrylate, 1,6-hexanediol diacrylate, neopentyl glycol diacrylate, 1,9-nonanediol diacrylate, 1,10-decanediol diacrylate, 1,12-dodecanediol diacrylate, propylene glycol diacrylate, dipropylene glycol diacrylate, 1-acryloyl-2-hydroxy-3-acryloylpropane, pentaerythritol tetraacrylate, 1,1,1-trimethylolpropane triacrylate, dipentaerythritol hexaacrylate, hexamethylolmelamine hexaacrylate, N,N',N"-tris(2-acryloyloxyethyl) isocyanurate, 2,2'-bis[4-(acryloxydiethoxy)phenyl]propane, 2,2'-bis[4-(acryloxydiethoxy)phenyl]methane, bis(acryloxymethyl)tricyclo[5.2.1.0$^{2,6}$]decane, bis(acryloxymethyl)pentacyclo[6.5.1$^{3,6}$.0$^{2,7}$.0$^{9,13}$]pentadecane, bis(acryloxymethyl)heptacyclo[10.5.1.1$^{3,10}$.1$^{5,8}$.0$^{2,11}$0.$^{4,9}$.0$^{13,17}$]-eicosane, polyethylene glycol diacrylate, etc.; methacrylic acid esters such as ethylene glycol dimethacrylate, diethylene glycol dimethacrylate, triethylene glycol dimethacrylate, tetraethylene glycol dimethacrylate, glycerine dimethacrylate, 1,3-butylene glycol dimethacrylate, 1,4-butanediol dimethacrylate, 1,6-hexanediol dimethacrylate, neopentyl glycol dimethacrylate, 1,9-nonanediol dimethacrylate, 1,10-decanediol dimethacrylate, 1,12-dodecanediol dimethacrylate, propylene glycol dimethacrylate, dipropylene glycol dimethacrylate, tripropylene glycol dimethacrylate, 1-methacryloyl-2-hydroxy-3-acryloylpropane, 1-methacryloyl-2-hydroxy-3-methacryloylpropane, pentaerythritol tetramethacrylate, 1,1,1-trimethylolpropane trimethacrylate, dipentaerythritol hexamethacrylate, hexamethylolmelamine hexamethacrylate, N,N',N"-tris(2-methacryloyloxyethyl) isocyanurate, 2,2'-bis[4-(methacryloxydiethoxy)phenyl]propane, 2,2'-bis[4(methacryloxydiethoxy)phenyl]methane, bis(methacryloxymethyl)tricyclo[5.2.1.0$^{2,6}$]decane, bis(methacryloxymethyl)pentacyclo[6.5.1$^{3,6}$.0$^{2,7}$.0$^{9,13}$]pentadecane, bis(methacryloxymethyl)heptacyclo[10.5.1.1$^{3,10}$.1$^{5,8}$.0$^{2,11}$.0$^{4,9}$.0$^{13,17}$]eicosane, polyethylene glycol dimethacrylate, etc.; allyl compounds and allylidene compounds such as ethylene glycol bisallyl carbonate, diethylene glycol bisallyl carbonate, triethylene glycol bisallyl carbonate, tetraethylene glycol bisallyl carbonate, pentaethylene glycol bisallyl carbonate, polyethylene glycol bisallyl carbonate, trimethylene glycol bisallyl carbonate, 3-hydroxypropoxy propanol bisallyl carbonate, glycerine bisallyl carbonate, triglycerine bisallyl carbonate, diallyl carbonate, diallylidene pentaerythritol, triallylidene sorbitol, diallylidene-2,2,6,6-tetramethylolcyclohexanone, triallylidene hexamethylol melamine, diallylidene-D-glucose, bisphenol A diallyl ether, bisphenol S diallyl ether, ethylene glycol diallyl ether, diethylene glycol diallyl ether, triethylene glycol diallyl ether, 1,1,1-trimethylolpropane triallyl ether, neopentyl glycol triallyl ether, allyl acrylate, methallyl acrylate, vinyl acrylate, allyl methacrylate, methallyl methacrylate, vinyl methacrylate, diallyl phthalate (diallyl ortho-phthalate, diallyl isophthalate, diallyl terephthalate, a mixture of two or more of these compounds), triallyl isocyanurate; etc.; divinylbenzene, etc. These compounds can be used singly or as a mixture thereof.

From the viewpoints of specific gravity, transparency, heat resistance and impact resistance, the use of the following monomers among these monomers is preferable: divinylbenzene, diallyl phthalate, allyl acrylate, methallyl acrylate; alkylene glycol diacrylates with an alkylene group having 2 to 12 carbon atoms such as ethylene glycol diacrylate, propylene glycol diacrylate, 1,3-butylene glycol diacrylate, 1,4butanediol diacrylate, 1,6-hexanediol diacrylate, neopentyl glycol diacrylate, 1,9-nonanediol diacrylate, 1,10-decanediol diacrylate, and 1,12-dodecanediol diacrylate; allyl methacrylate, methallyl methacrylate; and alkylene glycol dimethacrylates with an alkylene group having 2 to 12 carbon atoms such as ethylene glycol dimethacrylate, propylene glycol dimethacrylate, lens, there can be used a conventional polymerization initiator used for radical polymerization. Examples of the polymerization initiator are organic peroxides such as 1,1-bis(t-butylperoxy)-3,3,5-trimethylcyclohexane, 1,1-bis(t-butylperoxy)cyclohexane, n-butyl-4,4'-bis(t-butylperoxy) valerate, decanoyl peroxide, lauroyl peroxide, benzoyl peroxide, m-toluoyl peroxide, diisopropyl peroxydicarbonate, di-2-ethylhexyl peroxydicarbonate, dinormalpropyl peroxydicarbonate, dimethoxyisopropyl peroxydicarbonate, cumyl peroxyneodecanoate, t-butyl peroxy-2-ethylhexanoate, t-butyl peroxy-3,5,5,-trimethylhexanoate, di-t-butyl diperoxyisophthalate, t-butyl peroxyisopropylcarbonate, etc.; azo polymerization initiators such as 2,2'-azobis(isobutyronitrile), 2,2'-azobis(4-methoxy-2,4-dimethylvaleronitrile), 2,2'-azobis(2,4-dimethylvaleronitrile), dimethyl-2,2'-azobisisobutylate, 2,2'-azobis(2-methylbutyronitrile), 1,1'-azobis(1-cyclohexanecarbonitrile), 2-phenylazo-2,4-dimethyl-4-methoxyvaleronitrile, 2,2'-azobis(2methylpropane), etc. These polymerization initiators can be used singly or as a mixture thereof.

The polymerization initiator can preferably be used in an amount of 0.001 to 10 parts by weight per 100 parts by weight of the total monomers. Considering the surface state of the obtained polymer and the polymerization time, the used of 0.01 to 5 parts by weight per 100 parts by weight of the total monomer is particularly preferable.

The molecular weight modifier and the polymerization initiator are preferably dissolved in the monomers before polymerization. Next, the resulting solution of mixture is cured and molded by a casting polymerization. The curing temperature changes depending on the kind of polymerization initiator used and is suitably at 30° to 120° C. In order to obtain a cast plate with lesser strain, it is preferable to conduct curing gradually at a relatively low temperature. The resulting resin is a crosslinked polymer.

From the viewpoint of prevention of deterioration, thermal stability, processability, and the like, it is preferable to add to the resin of the present invention one or more antioxidants such as phosphite compounds, phenolic compounds, thioether compounds, etc.; surfactants such as aliphatic alcohols, fatty acid esters, phthalic acid esters, triglyceride compounds, fluorine compounds, etc.; mold release agents such as metal salts of higher fatty acids; and conventional lubricants, plasticizers, ultraviolet absorbers, fire retardants, heavy metal inactivating agents, etc. These are dissolved in the above solution of mixture before polymerization of monomers, if used.

By coating on one or both surfaces of molded articles with inorganic compounds such as $MgF_2$, $SiO_2$, etc. by a vacuum metallizing method, a sputtering method, an ion plating method, etc. or with one or more organic silicone compounds such as silane coupling agents, vinyl monomers, melamine resins, epoxy resins, fluorine resins, silicone resins to give a hard coating, moisture resistance, optical properties, chemical resistance, wear resistance, defogging of the molded articles can be improved.

The present invention further provides a plastic lens comprising a substrate mainly made of the resin for plastic lenses mentioned above, a primer layer formed on one or both surfaces of the substrate, said primer layer being a resin film comprising as a main component a copolymer of an alkyl acrylate or alkyl methacrylate and an aromatic vinyl compound as essential components, said copolymer further containing at least one functional group selected from a hydroxyl group, a carboxyl group, an epoxy group and an alkoxysilyl group, and a layer of cured silicone resin formed on the primer layer.

The substrate is mainly made of the resin for plastic lenses mentioned above. If necessary, the substrate can be a composite material comprising the molded resin mentioned above and glass or other plastic lens material adhered thereto.

Examples of the alkyl acrylate and alkyl methacrylate used as a component of the copolymer are methyl acrylate, ethyl acrylate, butyl acrylate, 2-ethylhexyl acrylate, octyl acrylate, methyl methacrylate, ethyl methacrylate, isopropyl methacrylate, butyl methacrylate, 2-ethylhexyl methacrylate, octyl methacrylate, etc.

Examples of the aromatic vinyl compound used as a component of the copolymer are styrene, m-methylstyrene, etc.

The functional group (or reactive residue) selected from a hydroxyl group, a carboxyl group, epoxy group and an alkoxysilyl group of the copolymer can be introduced into the copolymer by copolymerizing a polymerizable monomer having such a reactive residue. Examples of the polymerizable monomer are glycidyl acrylate, glycidyl methacrylate, 2-hydroxyethyl acrylate, 2-hydroxyethyl methacrylate, acrylic acid, methacrylic acid, γ-(methacryloxypropyl)trimethoxysilane, γ-(methacryloxypropyl)triethoxysilane, γ-(methacryloxypropyl)tributoxysilane, etc.

It is preferable to use the alkyl acrylate or alkyl methacrylate in an amount of 10 to 60% by weight, the aromatic vinyl compound in an amount of 30 to 70% by weight, and the polymerizable monomer having a reactive residue in an amount of 1 to 20% by weight.

When the amount of the alkyl acrylate or alkyl methacrylate is less than 10% by weight, there is a tendency to lower the flexibility of the primer layer, while when the amount is more than 60% by weight, there is a tendency to lower the adhesion to the substrate. Further when the amount of the aromatic vinyl compound is less than 30% by weight, there is a tendency to lower the adhesion to the substrate, while when the amount is the primer layer may further contain one or more silicone or fluorine-based surfactants, ultraviolet absorbers, dyes, etc.

As the solvent for the primer solution, there can be used alcohols such as methanol, ethanol, propanol, isopropanol, butanol, cyclopentanol, hexanol, etc.; ketones such as acetone, methyl ethyl ketone, methyl isobutyl ketone, etc.; acetate esters such as methyl acetate, ethyl acetate, butyl acetate, etc.; ethers such as methyl Cellosolve, ethyl Cellosolve, butyl Cellosolve, etc.; carbitols such as methyl carbitol, ethyl carbitol, butyl carbitol, etc.; polar aprotic solvents such as dioxane, tetrahydrofuran, dimethylformamide, etc.; hydrocarbons such as pentane, hexane, heptane, octane, cyclopentane, cyclohexane, benzene, toluene, xylenes, etc.

As the silicone resin for forming the cured silicone resin layer, there can be used an organic silicon compound of the formula:

$$R^1R^2{}_a Si(OR^3)_{3-a} \qquad (I)$$

wherein $R^1$ is an organic group including an epoxy group having 2 to 8 carbon atoms; $R^2$ is an alkyl group preferably having 1 to 6 carbon atoms, an alkenyl group, a halogenized alkyl group or an allyl group; $R^3$ is a hydrogen atom, an alkyl group preferably having 1 to 4 carbon atoms, an alkoxyalkyl group or an acyl group; and "a" is zero or an integer of 1 or 2, and a partially hydrolyzed product thereof.

The cured silicone resin layer can be formed by coating a liquid obtained by dissolving or dispersing the silicone resin and preferably together with inorganic very fine particles in a solvent such as water or an alcohol such as methanol, ethanol, isobutanol, diacetone alcohol, etc. on the primer layer, followed by heating at 50° to 140° C. for curing.

The inorganic very fine particles give preferable hardness to the cured film of silicone resin. As the inorganic very fine particles, there can be used antimony oxide sol, silica sol, titania sol, alumina sol, etc., preferably having a particle size of 1 to 200 mμ, more preferably 5 to 100 mμ. When the particle size of the inorganic fine particles is less than 1 mμ, there is no effect for improving the hardness of the cured film of silicone resin, while when the particle size is more than 200 mμ, the transparency is lowered. It is preferable to use the inorganic particles in an amount of preferably 5 to 200 parts by weight, more preferably 20 to 100 parts by weight, per 100 parts by weight of the silicone resin. When the amount of the inorganic particles is too small, there is no effect for improving the hardness of the cured film of silicone resin. On the other hand, when the amount is too large, the cured film of silicone resin becomes brittle. As the inorganic fine particles, there can be used commercially available colloidal solutions dispersed in water or an organic solvent. Examples of such colloidal solutions are, for example, Snow Tex O, Methanol Silicagel, Alumina Sol 520, Titanium Oxide Sol NTS-10R (mfd. by Nissan Chemical Industries, Ltd.), Alumina Kureya Sol (mfd. by Kawasaki Fine Chemical Co., Ltd.), etc.

The silicone resin can contain as a curing catalyst aluminum chelate, perchloric acid, ammonium perchlorate, a perchlorate salt such as aluminum perchlorate, an alkali metal salt such as sodium acetate, potassium propionate, etc., a quaternary ammonium salt such as tetramethylammonium hydroxide, etc.

The present invention is illustrated by way of the following Examples, in which all parts and percents are by weight, unless otherwise specified.

EXAMPLES 1 TO 19

To a liquid monomer mixture shown in Table 1, 0.5 part of lauroyl peroxide and 0.2 part of 1,1-bis(t-butylperoxy)-3,3,5-trimethylcyclohexane as radical polymerization initiators were added and stirred sufficiently. Then, the resulting mixture was poured into a mold comprising two sheets of glass and a gasket and heated from 30° C. to 90° C. in 20 hours. A cured lens was taken from the mold and heated at 120° C. for 1 hour.

Haze rate (transparency)

According to ASTM D 1003, the haze tale of a lens having a center thickness of 5 mm was measured. The small the value of haze rate becomes, the better the transparency becomes.

Impact resistance

A lens having a center thickness of 2 nun was judged according to the FDA standard.

Evaluation: O not broken, x broken.

Chemical Resistance

A lens was immersed in acetone or toluene at room temperature for 24 hours and a surface state was evaluated.

Evaluation: 0 no change in surface appearance, Δ slightly clouded, x clouded or dissolved.

Edging ability

A lens was edged by grinding with a lens edger.

Evaluation: O The lens was finely edged.

x The edge of lens was locally melted.

Abbreviations of monomers and polymerization initiators used hereinafter are as follows.

ST styrene

TCDMA tricyclo[5.2.1.0$^{2,6}$]deca-8-yl methacrylate

MMA methyl methacrylate

DAP diallyl ortho-phthalate

AMA allyl methacrylate

EGDM ethylene glycol dimethacrylate

HDDM 1,6-hexanediol dimethacrylate

DDDM 1,12-dodecanediol dimethacrylate

α-MSD α-methylstyrene dimer

NOM n-octylmercaptan

TDM t-dodecylmercaptan

The amount of α-MSD, NOM or TDM is expressed in % by weight based on the total weight of the monomers shown in Tables 1 and 2.

TABLE 1

| Example No. | Monomer composition (parts) | | | | | | | | Polymerization initiator (%) |
|---|---|---|---|---|---|---|---|---|---|
| | ST | TCDMA | MMA | DAP | AMA | EGDM | HDDM | DDDM | |
| 1 | 50 | 30 | 10 | 10 | — | — | — | — | α-MSD 1.0 |
| 2 | 50 | 30 | 10 | 10 | — | — | — | — | α-MSD 4.0 |
| 3 | 40 | 30 | 10 | 20 | — | — | — | — | α-MSD 1.0 |
| 4 | 40 | 30 | 20 | 10 | — | — | — | — | α-MSD 1.0 |
| 5 | 30 | 50 | 10 | 10 | — | — | — | — | α-MSD 1.0 |
| 6 | 50 | 30 | 10 | — | 10 | — | — | — | α-MSD 1.0 |
| 7 | 40 | 30 | 20 | — | 10 | — | — | — | α-MSD 1.0 |
| 8 | 30 | 50 | 10 | — | 10 | — | — | — | α-MSD 1.0 |
| 9 | 50 | 30 | 10 | — | — | 10 | — | — | α-MSD 1.0 |
| 10 | 40 | 30 | 20 | — | — | 10 | — | — | α-MSD 1.0 |
| 11 | 30 | 50 | 10 | — | — | 10 | — | — | α-MSD 1.0 |

TABLE 1-continued

| Example | Monomer composition (parts) | | | | | | | | Polymerization |
|---|---|---|---|---|---|---|---|---|---|
| No. | ST | TCDMA | MMA | DAP | AMA | EGDM | HDDM | DDDM | initiator (%) |
| 12 | 50 | 30 | 10 | — | — | — | 10 | — | α-MSD 1.0 |
| 13 | 40 | 30 | 20 | — | — | — | 10 | — | α-MSD 1.0 |
| 14 | 30 | 50 | 10 | — | — | — | 10 | — | α-MSD 1.0 |
| 15 | 50 | 30 | 10 | — | — | — | — | 10 | α-MSD 1.0 |
| 16 | 40 | 30 | 20 | — | — | — | — | 10 | α-MSD 1.0 |
| 17 | 30 | 50 | 10 | — | — | — | — | 10 | α-MSD 1.0 |
| 18 | 50 | 30 | 10 | — | — | 10 | — | — | NOM 1.0 |
| 19 | 50 | 30 | 10 | — | — | 10 | — | — | TDM 1.0 |

TABLE 2

| Comparative | Monomer composition (parts) | | | | | | | | α-MSD |
|---|---|---|---|---|---|---|---|---|---|
| Example No. | ST | TCDMA | MMA | DAP | AMA | EGDM | HDDM | DDDM | (%) |
| 1 | 100 | — | — | — | — | — | — | — | — |
| 2 | — | 100 | — | — | — | — | — | — | — |
| 3 | — | — | 100 | — | — | — | — | — | — |
| 4 | 60 | 30 | 10 | — | — | — | — | — | — |
| 5 | 60 | 30 | 10 | — | — | — | — | — | 1.0 |
| 6 | 20 | 30 | 10 | 40 | — | — | — | — | 1.0 |
| 7 | 60 | 30 | — | 10 | — | — | — | — | — |
| 8 | 50 | 30 | 10 | 10 | — | — | — | — | — |
| 9 | 50 | 30 | 10 | 10 | — | — | — | — | 7.0 |

TABLE 3

| Example No. | Refractive index (−) | Abbe's number (−) | Specific gravity (g/cm³) | Heat resistance (°C.) | Haze rate (%) | Impact resistance | Chemical resistance | Edging ability |
|---|---|---|---|---|---|---|---|---|
| 1 | 1.56 | 38 | 1.10 | 119 | 0.6 | ○ | ○ | ○ |
| 2 | 1.56 | 38 | 1.10 | 117 | 0.4 | ○ | ○ | ○ |
| 3 | 1.56 | 39 | 1.12 | 121 | 0.5 | ○ | ○ | ○ |
| 4 | 1.55 | 40 | 1.12 | 124 | 0.5 | ○ | ○ | ○ |
| 5 | 1.55 | 41 | 1.10 | 135 | 0.6 | ○ | ○ | ○ |
| 6 | 1.55 | 40 | 1.08 | 117 | 0.6 | ○ | ○ | ○ |
| 7 | 1.54 | 42 | 1.10 | 119 | 0.5 | ○ | ○ | ○ |
| 8 | 1.54 | 43 | 1.08 | 130 | 0.5 | ○ | ○ | ○ |
| 9 | 1.55 | 41 | 1.08 | 115 | 0.5 | ○ | ○ | ○ |
| 10 | 1.54 | 42 | 1.11 | 118 | 0.6 | ○ | ○ | ○ |
| 11 | 1.54 | 43 | 1.09 | 128 | 0.6 | ○ | ○ | ○ |
| 12 | 1.55 | 40 | 1.07 | 113 | 0.7 | ○ | ○ | ○ |
| 13 | 1.54 | 42 | 1.09 | 126 | 0.5 | ○ | ○ | ○ |
| 14 | 1.54 | 42 | 1.08 | 111 | 0.6 | ○ | ○ | ○ |
| 15 | 1.55 | 41 | 1.07 | 112 | 0.6 | ○ | ○ | ○ |
| 16 | 1.54 | 42 | 1.09 | 125 | 0.6 | ○ | ○ | ○ |
| 17 | 1.54 | 42 | 1.07 | 110 | 0.7 | ○ | ○ | ○ |
| 18 | 1.55 | 41 | 1.08 | 108 | 0.9* | ○ | ○ | ○ |
| 19 | 1.55 | 41 | 1.09 | 109 | 0.8 | ○ | ○ | ○ |

Note) *: Lens was slightly colored in yellow.

TABLE 4

| Comparative Example No. | Refractive index (−) | Abbe's number (−) | Specific gravity (g/cm³) | Heat resistance (°C.) | Haze rate (%) | Impact resistance | Chemical resistance | Edging ability |
|---|---|---|---|---|---|---|---|---|
| 1 | 1.59 | 31 | 1.06 | 95 | 0.8 | ○ | x | x |

TABLE 4-continued

| Comparative Example No. | Refractive index (−) | Abbe's number (−) | Specific gravity (g/cm³) | Heat resistance (°C.) | Haze rate (%) | Impact resistance | Chemical resistance | Edging ability |
|---|---|---|---|---|---|---|---|---|
| 2 | 1.53 | 58 | 1.09 | 170 | 0.7 | x | x | x |
| 3 | 1.49 | 58 | 1.19 | 108 | 0.5 | o | x | x |
| 4 | 1.56 | 37 | 1.08 | 107 | 3.2 | o | x | x |
| 5 | 1.56 | 37 | 1.08 | 106 | 1.0 | o | x | x |
| 6 | 1.56 | 37 | 1.16 | 132 | 0.8 | o | o | o |
| 7 | 1.57 | 35 | 1.08 | 120 | 1.8 | o | o | o |
| 8 | 1.56 | 38 | 1.10 | 121 | 1.5 | o | o | o |
| 9 | 1.56 | 37 | 1.10 | 91 | 0.7 | o | Δ | o |

EXAMPLES 20 TO 38, COMPARATIVE EXAMPLES 10 TO 16

Lenses were molded in the same manner as described in Examples 1 to 19 except for using liquid mixtures shown in Table 5 and 6 in place of the liquid mixtures shown in Table 1. Properties were evaluated in the same manner as described in Examples 1 to 19 and listed in Tables 7 and 8.

In Tables 5 and 6, NBMA means norbornyl methacrylate. Further, the amount of α-MSD, NOM or TDM is expressed in % by weight based on the total weight of the monomers.

TABLE 5

| Example No. | Monomer composition (parts) | | | | | | | | Polymerization initiator (%) |
|---|---|---|---|---|---|---|---|---|---|
| | ST | NBMA | MMA | DAP | AMA | EGDM | HDDM | DDDM | |
| 20 | 50 | 30 | 10 | 10 | — | — | — | — | α-MSD 1.0 |
| 21 | 50 | 30 | 10 | 10 | — | — | — | — | α-MSD 4.0 |
| 22 | 40 | 30 | 10 | 20 | — | — | — | — | α-MSD 1.0 |
| 23 | 40 | 30 | 20 | 10 | — | — | — | — | α-MSD 1.0 |
| 24 | 30 | 50 | 10 | 10 | — | — | — | — | α-MSD 1.0 |
| 25 | 50 | 30 | 10 | — | 10 | — | — | — | α-MSD 1.0 |
| 26 | 40 | 30 | 20 | — | 10 | — | — | — | α-MSD 1.0 |
| 27 | 30 | 50 | 10 | — | 10 | — | — | — | α-MSD 1.0 |
| 28 | 50 | 30 | 10 | — | — | 10 | — | — | α-MSD 1.0 |
| 29 | 40 | 30 | 20 | — | — | 10 | — | — | α-MSD 1.0 |
| 30 | 30 | 50 | 10 | — | — | 10 | — | — | α-MSD 1.0 |
| 31 | 50 | 30 | 10 | — | — | — | 10 | — | α-MSD 1.0 |
| 32 | 40 | 30 | 20 | — | — | — | 10 | — | α-MSD 1.0 |
| 33 | 30 | 50 | 10 | — | — | — | 10 | — | α-MSD 1.0 |
| 34 | 50 | 30 | 10 | — | — | — | — | 10 | α-MSD 1.0 |
| 35 | 40 | 30 | 20 | — | — | — | — | 10 | α-MSD 1.0 |
| 36 | 30 | 50 | 10 | — | — | — | — | 10 | α-MSD 1.0 |
| 37 | 50 | 30 | 10 | — | — | 10 | — | — | NOM 1.0 |
| 38 | 30 | 50 | 10 | — | — | 10 | — | — | TDM 1.0 |

TABLE 6

| Comparative Example No. | Monomer composition (parts) | | | | | | | | α-MSD (%) |
|---|---|---|---|---|---|---|---|---|---|
| | ST | NBMA | MMA | DAP | AMA | EGDM | HDDM | DDDM | |
| 10 | — | 100 | — | — | — | — | — | — | — |
| 11 | 60 | 30 | 10 | — | — | — | — | — | — |
| 12 | 60 | 30 | 10 | — | — | — | — | — | 1.0 |
| 13 | 20 | 30 | 10 | 40 | — | — | — | — | 1.0 |
| 14 | 60 | 30 | — | 10 | — | — | — | — | — |
| 15 | 50 | 30 | 10 | 10 | — | — | — | — | — |
| 16 | 50 | 30 | 10 | 10 | — | — | — | — | 7.0 |

TABLE 7

| Example No. | Refractive index (−) | Abbe's number (−) | Specific gravity (g/cm³) | Heat resistance (°C.) | Haze rate (%) | Impact resistance | Chemical resistance | Edging ability |
| --- | --- | --- | --- | --- | --- | --- | --- | --- |
| 20 | 1.56 | 38 | 1.10 | 118 | 0.7 | o | o | o |
| 21 | 1.56 | 38 | 1.10 | 116 | 0.5 | o | o | o |
| 22 | 1.56 | 39 | 1.12 | 121 | 0.6 | o | o | o |
| 23 | 1.55 | 40 | 1.12 | 123 | 0.5 | o | o | o |
| 24 | 1.55 | 41 | 1.10 | 135 | 0.7 | o | o | o |
| 25 | 1.55 | 40 | 1.08 | 116 | 0.6 | o | o | o |
| 26 | 1.54 | 42 | 1.10 | 119 | 0.7 | o | o | o |
| 27 | 1.54 | 43 | 1.08 | 129 | 0.6 | o | o | o |
| 28 | 1.55 | 41 | 1.08 | 115 | 0.6 | o | o | o |
| 29 | 1.54 | 42 | 1.11 | 117 | 0.5 | o | o | o |
| 30 | 1.54 | 43 | 1.09 | 127 | 0.6 | o | o | o |
| 31 | 1.55 | 40 | 1.07 | 112 | 0.6 | o | o | o |
| 32 | 1.54 | 42 | 1.09 | 124 | 0.5 | o | o | o |
| 33 | 1.54 | 42 | 1.08 | 110 | 0.7 | o | o | o |
| 34 | 1.55 | 41 | 1.07 | 112 | 0.7 | o | o | o |
| 35 | 1.54 | 42 | 1.09 | 123 | 0.6 | o | o | o |
| 36 | 1.54 | 42 | 1.07 | 108 | 0.6 | o | o | o |
| 37 | 1.55 | 41 | 1.08 | 115 | 0.9* | o | o | o |
| 38 | 1.55 | 41 | 1.08 | 115 | 0.9 | o | o | o |

Note) *: Lens was slightly colored in yellow.

TABLE 8

| Comparative Example No. | Refractive index (−) | Abbe's number (−) | Specific gravity (g/cm³) | Heat resistance (°C.) | Haze rate (%) | Impact resistance | Chemical resistance | Edging ability |
| --- | --- | --- | --- | --- | --- | --- | --- | --- |
| 10 | 1.53 | 58 | 1.09 | 143 | 0.8 | x | x | x |
| 11 | 1.56 | 37 | 1.08 | 105 | 3.5 | o | x | x |
| 12 | 1.56 | 37 | 1.08 | 103 | 1.2 | o | x | x |
| 13 | 1.56 | 37 | 1.10 | 130 | 0.9 | o | o | o |
| 14 | 1.57 | 35 | 1.08 | 120 | 1.7 | o | o | o |
| 15 | 1.56 | 38 | 1.10 | 120 | 1.4 | o | o | o |
| 16 | 1.56 | 37 | 1.10 | 90 | 0.8 | o | Δ | o |

PRODUCTION EXAMPLES 1 TO 7

Preparation of primer coating solution

In a flask equipped with a stirrer, 100 parts of a liquid mixture shown in Table 9, 200 parts of ethyl Cellosolve, 0.2 part of t-butyl peroxide (2-ethyl hexanoate) as a radical polymerization initiator, 0.05 part of α-methylstyrene dimer as a chain transfer agent were placed and stirred at 80° C. for 4 hours under a nitrogen atmosphere, followed by stirring at 90° C. for 2 hours with heating to complete the reaction. The resulting solution was adjusted to the solid content of 10% with diacetone alcohol, ethyl Cellosolve, methyl isobutyl ketone, isobutyl acetate or isopropanol.

PRODUCTION EXAMPLE 8

Preparation of silicone resin coating solution

In a flask equipped with a stirrer, 100 g of γ-glycidoxypropyltrimethoxylsilane, 100 g of γ-glycidoxypropylmethyldiethoxysilane, and 80 g of isobutyl alcohol were placed, and 35 g of 0.05N dilute hydrochloric acid was dropped in 30 minutes into the flask while maintaining the temperature at 0° to 10° C., followed by addition of 300 g of colloidal silica Snow Tex O (mfd. by Nissan Chemical Industries, Ltd., $SiO_2$ content 20%) thereto. After stirring at room temperature for 20 hours, 50 g of ethanol and 70 g of ethyl Cellosolve were added thereto, followed by addition of 2 g of 10% aqueous solution of potassium propionate. Then, the resulting solution was adjusted to pH 6 to 7 with acetic acid.

EXAMPLES 39 TO 45, COMPARATIVE EXAMPLES 17 TO 19

Lens substrates obtained in Examples 6, 8, 9 and 11 were coated with the primer solutions of Production Examples 5 to 11 by a dipping method (a pick-up speed 20 cm/min), and dried in a hot air drier at 90° C. for 1 hour. Then, the resulting primer treated lens was coated with the silicone resin coating solution of Production Example 12 by a dipping method (a pick-up speed 30 cm/min), followed by heating at 110° C. for 2 hours in a hot air drier for curing. The thicknesses of the resulting primer layer and the cured silicone resin film were 3 μm, respectively.

Adhesiveness of the primer layer to the lens substrate, adhesiveness of the silicone resin cured film to the primer treated lens, and resistance to scratching of the silicone resin cured film were measured and shown in Table 10. Adhesiveness and resistance to scratching were measured as follows.

Adhesiveness

A cured film was cut crosswise using a knife so as to give 100 squares, each having a size of 1 mm×1 mm. After adhering a cellophane tape (mfd. by Nichiban Co., Ltd.) to the crosswise cut film, the cellophane tape was peeled off rapidly. The number of remaining squares was counted. Evaluation: O 100/100, x 0/100

Resistance to scratching

A cured film was subjected to 10 times of reciprocating rubbing using a steel wool (#0000) under a load of 500 g. Scratching on the surface was evaluated with the naked eye. Evaluation: O no scratch, x scratch

TABLE 9

| Production Example No. | Liquid mixture composition (%) | | | | | |
|---|---|---|---|---|---|---|
| | MMA | ST | HEMA | MAA | GMA | SiMA |
| 1 | 47.5 | 47.5 | 5.0 | — | — | — |
| 2 | 47.5 | 47.5 | — | 5.0 | — | — |
| 3 | 47.5 | 47.5 | — | — | 5.0 | — |
| 4 | 47.5 | 47.5 | — | — | — | 5.0 |
| 5 | 100 | — | — | — | — | — |
| 6 | — | 100 | — | — | — | — |
| 7 | 50.0 | 50.0 | — | — | — | — |

Note)
MMA methyl methacrylate
ST styrene
HEM 2-hydroxyethyl methacrylate
GMA glycidyl methacrylate
SiMA γ-(methacryloxypropyl)trimethoxysilane

TABLE 10

| | Example No. | | | | | | | Comparative Example No. | | |
|---|---|---|---|---|---|---|---|---|---|---|
| | 37 | 38 | 39 | 40 | 41 | 42 | 43 | 17 | 18 | 19 |
| Lens substrate (Example No.) | 6 | 8 | 9 | 11 | 9 | 9 | 9 | 9 | 9 | 9 |
| Primer (Production Example No.) | 4 | 4 | 4 | 4 | 1 | 2 | 3 | 5 | 6 | 7 |
| Adhesiveness | o | o | o | o | o | o | o | x | x | x |
| Resistance to scratching | o | o | o | o | o | o | o | x | x | x |

As mentioned above, the resin for plastic lenses of the present invention has a low specific gravity and is excellent in transparency, edging ability, and low in dispersion (high in Abbe's number), high in refractive index and high in heat resistance. Further, when one or more polyfunctional monomers such as divinylbenzene, diallyl phthalate, allyl acrylate, allyl methacrylate, methallyl acrylate, methallyl methacrylate, alkylene glycol diacrylates with an alkylene group having 2 to 12 carbon atoms, and alkylene glycol dimethacrylate with an alkylene group having 2 to 12 carbon atoms are used, the resulting resin is particularly preferable in the specific gravity, transparency, heat resistance, and impact resistance. In addition, when as the component (b) special methacrylates or acrylates are used, particularly preferably results are obtained in the specific gravity and low dispersion (high Abbe's number).

In the production of the resin for plastic lenses, when α-methylstyrene dimer is used as a molecular weight modifier, the resulting resin is particularly excellent in transparency and impact resistance.

Further, the plastic lens of the present invention has a low specific gravity and is low in dispersion (high in Abbe's number), excellent in heat resistance and good in adhesiveness to the silicon resin cured film and good in resistance to scratching.

What is claimed is:

1. A process for producing a resin for plastic lenses, which comprises polymerizing (a) 30 to 60 parts by weight of styrene, (b) 10 to 70 parts by weight of methacrylic acid ester or acrylic acid ester having an alicyclic hydrocarbon group having 5 to 22 carbon atoms at the ester portion, (c) 1 to 30 parts by weight of an polyfunctional monomer having 2 or more radical polymerizable functional groups, and (d) 0 to 40 parts by weight of a copolymerizable vinyl monomer other than the components (a) to (c), a total of (a) to (d) being 100 parts by weight, in the presence of 0.1 to 5% by weight of a molecular weight modifier based on the weight of the total monomers; said molecular weight modifier being selected from the group consisting of mercaptans and alphamethylstyrene dimer.

2. A process according to claim 1, wherein the molecular weight modifier is α-methylstyrene dimer.

3. A process according to claim 1, wherein the molecular weight modifier is present in an amount of 1.0 to 4.0% by weight based on the total weight of the monomers.

4. A process according to claim 1, wherein the polyfunctional monomer (c) is at least one member selected from the group consisting of divinylbenzene, diallyl phthalate, allyl acrylate, allyl methacrylate, methallyl acrylate, methallyl methacrylate, alkylene glycol diacrylates with an alkylene group having 2 to 12 carbon atoms and alkylene glycol dimethacrylates with a alkylene group having 2 to 12 carbon atoms.

5. A process according to claim 1, wherein the component (b) is at least one member selected from the group consisting of cyclopentyl methacrylate, cyclohexyl methacrylate, methylcyclohexyl methacrylate, trimethylcyclohexyl methacrylate, norbornyl methacrylate, norbornylmethyl methacrylate, isobornyl methacrylate, bornyl methacrylate, menthyl methacrylate, phenethyl methacrylate, adamantyl methacrylate, dimethyladamantyl methacrylate, tricyclo$(5.2.1.0^{2,6})$deca-8-yl methacrylate, tricyclo$(5.2.1.0^{2,6})$deca-4-methyl methacrylate, cyclodecyl methacrylate, cyclopentyl acrylate, cyclohexyl acrylate, methylcyclohexyl acrylate, trimethylcyclohexyl acrylate, norbornyl acrylate, norbornylmethyl acrylate, isobornyl acrylate, bornyl acrylate, menthyl acrylate, phenethyl acrylate, adamantyl acrylate, dimethyladamantyl acrylate, tricyclo$(5.2.1.0^{2,6})$deca-8-yl acrylate, tricyclo$(5.2.1.0^{2,6})$deca-4-methyl acrylate, and cyclodecyl acrylate.

6. A process according to claim 1, wherein the component (b) is at least one member selected from the group consisting of cyclohexyl methacrylate, norbornyl methacrylate, norbornylmethyl methacrylate, tricyclo$(5.2.1.0^{2,6})$deca-8-yl methacrylate and tricyclo$(5.2.1.0^{2,6})$deca-4-methyl methacrylate.

7. A process according to claim 1, wherein the mercaptan is n-octylmercaptan or t-dodecylmercaptan.

* * * * *